United States Patent [19]
Fey et al.

[11] Patent Number: 4,549,474
[45] Date of Patent: Oct. 29, 1985

[54] AIR CONDITIONER OUTLET

[75] Inventors: Michael Fey, Hilden; Wolfgang Finkelstein; Josef Haaz, both of Neukirchen-Vluyn; Hans Riegel, Geldern, all of Fed. Rep. of Germany

[73] Assignee: Gebruder Trox Gesellschaft mit beschrankter Haftung, Neukirchen-Vluyn, Fed. Rep. of Germany

[21] Appl. No.: 618,501

[22] Filed: Jun. 8, 1984

[30] Foreign Application Priority Data

Jun. 8, 1983 [GB] United Kingdom ............. 8315688

[51] Int. Cl.[4] ............................................. F24F 13/08
[52] U.S. Cl. ...................................... 98/120; 98/40 R
[58] Field of Search ............. 98/120, 40 V, 103, 114, 98/121 R, 40 B, 40 R

[56] References Cited

U.S. PATENT DOCUMENTS

| 280,092 | 6/1883 | Siltz | 98/120 X |
|---|---|---|---|
| 1,310,537 | 7/1919 | Merkel | 98/120 |
| 2,362,355 | 11/1944 | Collicutt | 98/40 V |
| 2,544,689 | 3/1951 | Kennedy | 98/40 V |
| 2,571,726 | 10/1951 | Koch | 98/114 X |
| 2,738,719 | 3/1956 | Caldwell | 98/40 V |
| 3,118,604 | 1/1964 | Bertin et al. | 98/40 V X |
| 3,347,146 | 10/1967 | Samuelsson et al. | 98/40 B |
| 4,425,840 | 1/1984 | Masao | 98/40 V |

FOREIGN PATENT DOCUMENTS 266104 2/1927 United Kingdom ............. 98/120

Primary Examiner—William E. Tapolcai
Attorney, Agent, or Firm—Karl F. Ross; Herbert Dubno

[57] ABSTRACT

A floor outlet for an air conditioner has a grill which is formed by ring elements whose radial connecting ribs are inclined to impart a vortex flow to the emerging air. A central baffle body is constituted by a disc and a multiplicity of angularly equispaced radially extending blades twisted out of the plane of the disc and projecting therefrom.

16 Claims, 4 Drawing Figures

AIR CONDITIONER OUTLET

FIELD OF THE INVENTION

This invention relates to air conditioner outlets or diffusers.

BACKGROUND OF THE INVENTION

It is usual when designing an air conditioner system to position the air outlets above the occupied space in any room, that is to say above head height. There is then no risk of creating unpleasant draughts and the incoming air is able to mix with ambient air before entering the region of the room which is occupied. In certain buildings, this is not possible and the air conditioner ducts and outlets must be floor mounted. The usually cool air then enters the occupied space directly from the outlets and there are unpleasant draught sensations and also wide variations in temperature between, for example, floor level and head height.

OBJECT OF THE INVENTION

It is an object of this invention to provide an improved air conditioner outlet which alleviates these problems.

SUMMARY OF THE INVENTION

Accordingly, the present invention comprises an air conditioner outlet comprising a body adapted for floor mounting and connectable with a supply of conditioned air; an apertured cover capable of supporting floor loads and vortex generating means for generating a vortex in conditioned air flowing outwardly through the apertured cover.

This generation of a vortex in the air issuing from the air conditioner outlet has two very important advantages. First, the air velocity of the incoming air is reduced much more rapidly than would be the case with a simple jet, thus reducing the risk of draughts. Second, the vortex effect provides for rapid mixing of the conditioned air with ambient air, thus lessening the likelihood of unpleasant temperature gradients.

Advantageously, the vortex generating means comprises a deflector element positioned in the body beneath the cover.

The deflector element can comprise a plurality of deflector blades disposed radially about a vertical axis.

Preferably, the body defines an internal stabilizing chamber upstream of the vortex generating means.

In any satisfactory air conditioner system, some form of temperature feed-back control must be provided. Often, room thermostats are mounted on a convenient wall to provide temperature signals which may be used to control either the temperature of the conditioned air or the volume of air at a predetermined temperature. If the building in which the air conditioner system is to be installed includes large open spaces with few fixed internal walls, there is then a difficulty as to where to position the room thermostats. This difficulty arises particularly with systems having floor mounted outlets since floor mounted outlets are ideally suited to large open-plan offices and the like.

In a known arrangement, floor mounted air conditioner outlets are connected through underfloor ducts with a supply of conditioned air. The underfloor space through which the ducts pass is exhausted at a relatively low rate by a fan system so that a small pressure differential is maintained between the room and the underfloor space. Exhaust ports can then be provided in the floor so that stale room air is drawn into the underfloor space and swept away through the fan system. The present invention seeks to make use of this known facility in overcoming the above-mentioned difficulty.

Accordingly, the present invention also comprises an air conditioner outlet for mounting in a floor above an exhausted underfloor space, which has a body connectable with a supply of conditioned air, an apertured cover capable of supporting floor loads, a conduit provided exteriorly of the body and terminating in an opening adjacent the apertured cover and temperature sensing means located in said conduit to provide an electrical indication of temperature, whereby in use the conduit communicates with the exhausted underfloor space with ambient air being drawn into said opening and across the temperature sensing means.

Preferably, the conduit defines an internal throat portion which is of smaller dimension than the opening and which is disposed between the opening and the temperature sensing means.

Suitably, there are provided within the body set-point means adjustable to set a desired temperature and comparator means providing an output electrical signal indicative of the difference between signals derived from the temperature sensor and set point means respectively.

It has been found, contrary to expectations, that a pressure differential between the room and the underfloor space of as little as 10 pascals is sufficient to draw along the conduit enough ambient air to provide a sensible measure of temperature. A pressure differential which was significantly greater would not be acceptable in the overall design of an air conditioner system as it would necessitate improvements in sealing at floor level.

BRIEF DESCRIPTION OF THE DRAWING

The invention will now be described by way of example with reference to the accompanying drawing in which.

SPECIFIC DESCRIPTION

Figure 1:
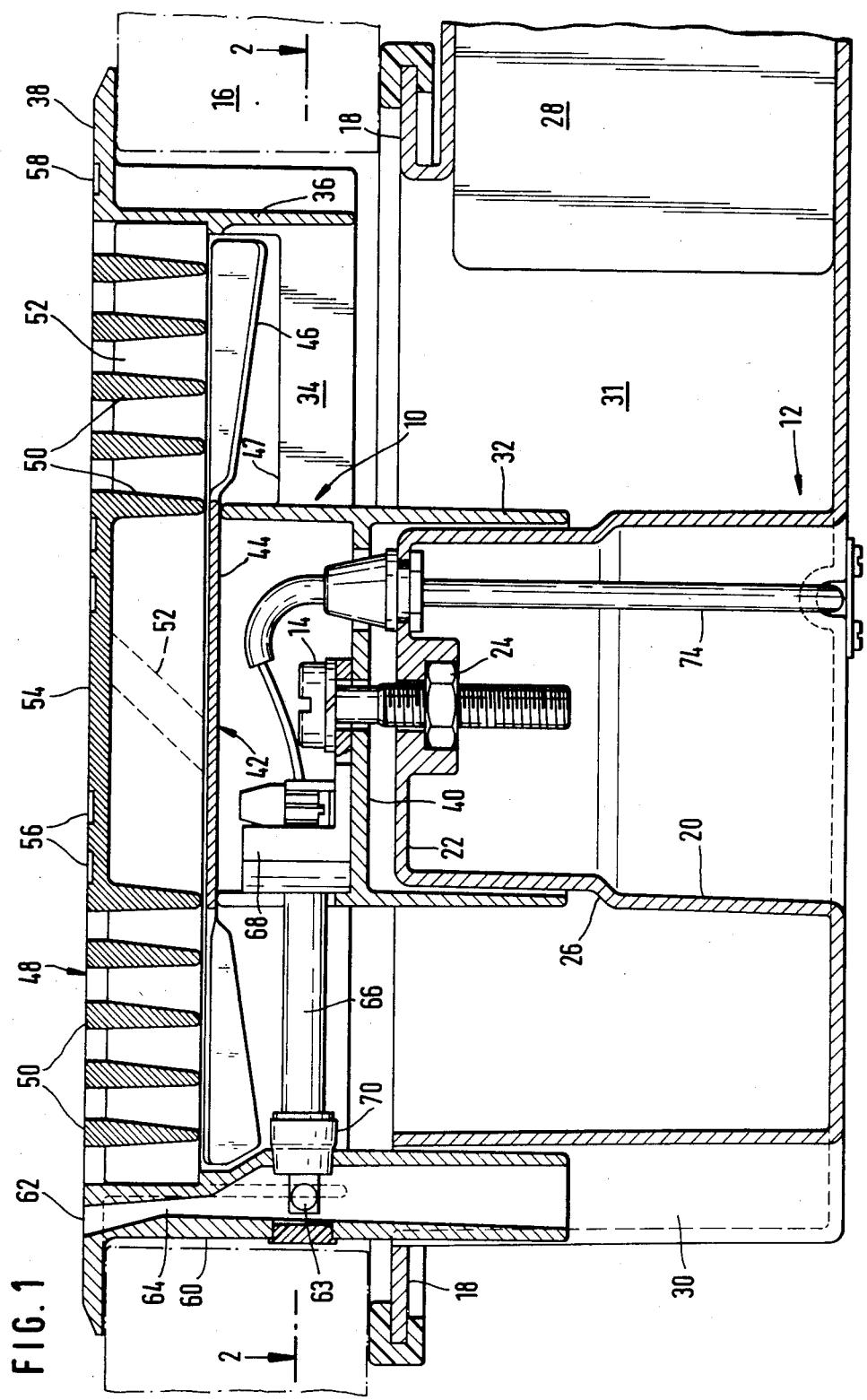
FIG. 1 is a vertical section through an air conditioner outlet according to the present invention.
Figure 2:
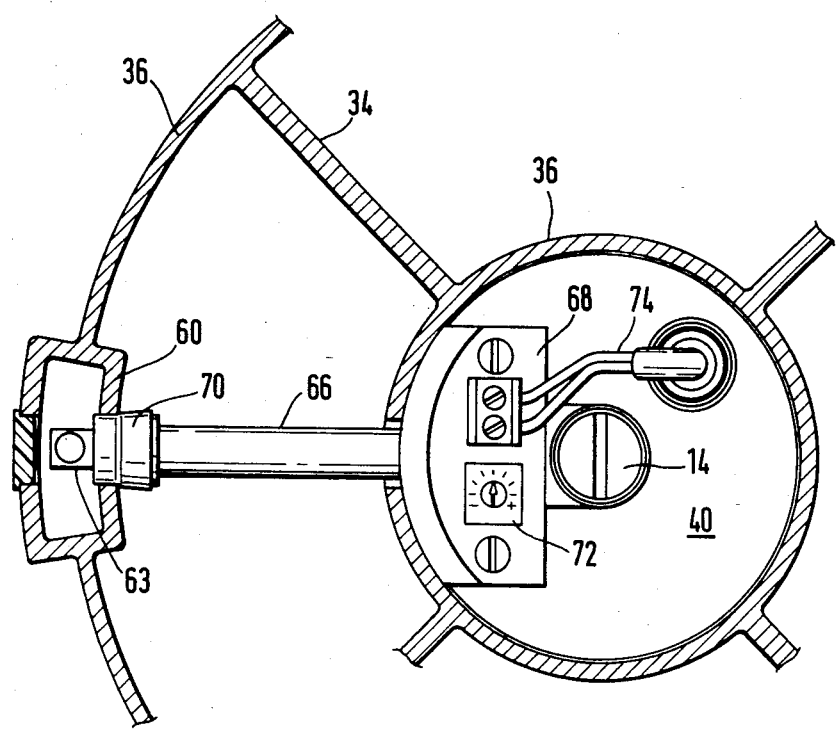
FIG. 2 is a sectional part view on line 2—2 of FIG. 1.

The air conditioner outlet shown in the drawings comprises an upper ring part 10 and a lower plenum part 12. The outlet is installed within a circular floor aperture with the ring part 10 being inserted from above floor level and the plenum part 12 from beneath floor level, the two parts being secured together through axial bolt 14 so effectively sandwiching the floor 16 at the periphery of the aperture.

The plenum part 12 is generally dish shaped with a peripheral flange 18 and a central domed portion 20 having a flat top 22 holding a captive nut 24 for bolt 14. A shoulder 26 is formed in the domed portion 20 to enable closer mating with the ring part 10 as will be described. A ducting port 28 extends radially to enable connection to be made to a supply of conditioned air. At a location diametrically opposite to the port 28 a vertical recess 30 is formed in the wall of the plenum part for a purpose which will be described hereinafter.

It will be understood that conditioned air entering the plenum through port 28 will encounter an annular chamber shown at 31 which opens upwardly. The plenum part thus serves to convert an incoming horizontal air jet into a vertical upward flow of annular cross section.

The ring part 10 comprises a central collar 32 formed integrally through radial webs 34 with a coaxial, cylindrical wall 36. The upper edge of this cylindrical wall is formed with an integral annular flange 38. It will be seen that this annular flange overlies the periphery of the floor aperture, the floor being effectively clamped between the annular flange 38 and the flange 18 of the plenum part. The central collar 32 has an integral mounting plate 40 disposed in a diametric plane; the bolt 14 passing through an aperture in this mounting plate.

Figure 3:
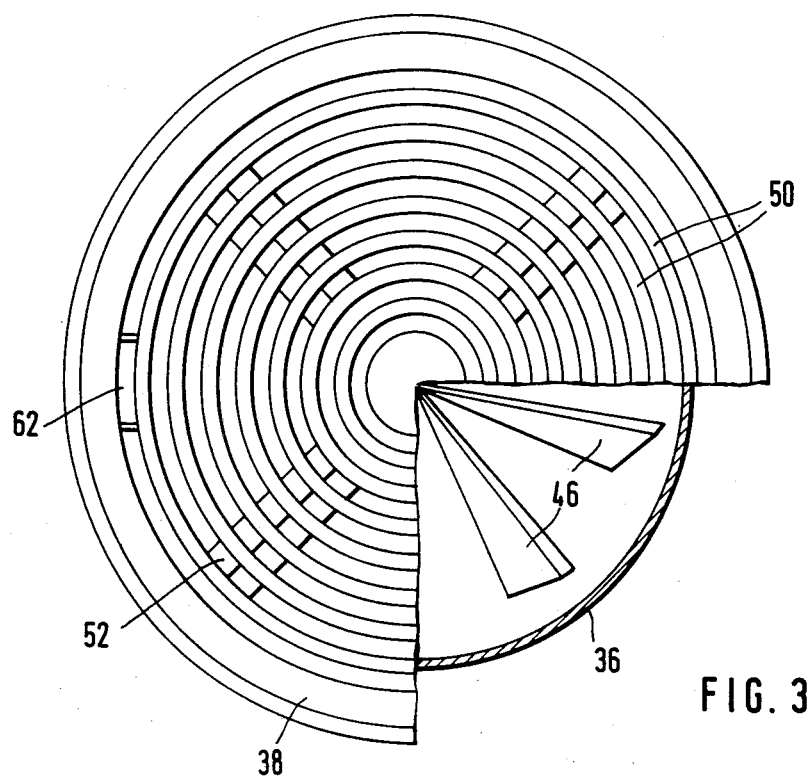
FIG. 3 is a plan view to a different scale of the outlet shown in FIG. 1, with a part removed for the sake of clarity.
Figure 4:
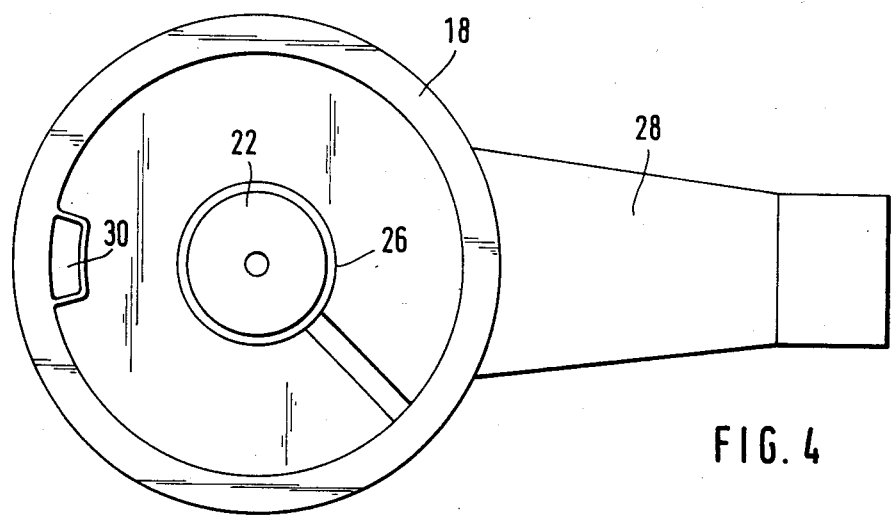
FIG. 4 is a plan view to a different scale of one component of the outlet shown in FIG. 1.

A circular deflecting element 42 is supported on the upper peripheral edge of collar 32. This element takes the form of a disc 44 from which there extends a plurality of radial blades 46. As can be seen in FIG. 1 and in FIG. 3, the plane of each blade is inclined with respect to the vertical direction. The deflecting element is in fact produced from a single sheet metal disc with the blades 46 being formed by twisting a section defined between radial cuts. A cut out 47 is provided in each rib 34 to accommodate the deflecting element.

A circular grill 48 is located in the recess defined by cylindrical wall 36 and lies immediately on top of the deflecting element 42. The grill comprises a concentric series of ring elements 50, the thickness of each of which decreases in the vertically downward direction. The ring elements are supported on four equiangularly spaced ribs 52 which extend radially from the innermost ring element and project a short distance beyond the outermost ring element so as to abut the cylindrical wall 36. Each rib 52 is of the same depth as the ring elements but is inclined (as shown in the phantom lines of FIG. 1) at an angle of 40° to the vertical. The circular region defined by the innermost ring element 50 is covered by an integral plate 54, there being formed two circular recesses 56 in the upper surface of this plate concentrically with and of the same radial dimension as the annular inter-rib spaces. A similar recess 58 is formed in the flange 38 of the ring part 10, the impression thus being created that the annular apertures extend over substantially the entire surface of the outlet.

At a location opposed to the port 28, the ring part 10 is formed with an integral downwardly extending conduit 60. This conduit has an opening 62 which lies within the above described recess 58 in the flange 38, the major portion of the conduit having a generally rectangular cross section which is of the same dimension as the opening in the circumferential sense, but of a substantially greater dimension in the radial sense. The radial dimension is in fact increased by a factor of 1.75 in this preferred embodiment. The conduit extends to approximately the depth of the central collar 32 and is located within the above described recess 30 of the plenum part. Between the opening 62 and the region of uniform cross section in the conduit, there is defined a throat portion 64 the minimum radial dimension of which is approximately one half of the radial dimension of the opening 62.

Within the conduit 60, in the region of uniform cross section, there is provided a temperature sensor 63 mounted on an arm 66 extending radially inwardly to a board 68 positioned on top of the plate 40. A conical grommet 70 provided at the outer end of the arm 66 ensures a tight fit with the complementary aperture provided in the conduit. The temperature sensor can take a number of forms, such as a thermocouple, a thermostat or a semiconductor device. In whatever form, the sensor provides an electrical indication of temperature which is compared by suitable circuitry mounted on the board 68 with a set point defined by potentiometer 72. A resultant out of balance signal is made available through leads 74 to a remote control point.

The operation of the above described air conditioner outlet can now be understood. In use, the outlet is connected via port 28 and other ducting with a variable air volume control which receives conditioned air from a central plant and which is capable of providing a selected volume flow of conditioned air to a number of similar outlets. The floor in which the outlets are mounted also contains a number of exhaust ports though which stale air is extracted under the action of a slight pressure differential set up between the room and the underfloor space by means of an exhaust fan system. This stale air is either exhausted to the atmosphere or returned to the air conditioning plant for recycling.

Air entering the plenum part through the port will be redirected upwardly in an annular flow. It will be observed that the plenum part defines an internal chamber which is of annular form and which is of substantially smooth outline. Care is for example taken to recess the domed portion at shoulder 26 to receive the lower edge of the collar 32. This annular chamber then serves as a stabilising chamber by the use of which the incoming horizontal jet of air can be converted into an upward annular flow with low losses and, in particular, with low noise.

The upwardly directed annular flow of air then encounters the blades 46 of the deflecting element. The action of these blades is to establish a vortex, imparting significant angular velocity to the flow. The air then passes outwardly between the ring elements 50, these clearly offering no significant resistance to the rotational motion. The supporting ribs 52 necessarily extend transversely to the direction of rotational flow and might constitute an obstacle to the rotation motion. It is for this reason that they are inclined to the vertical as described above. The sense of inclination is of course the same as that of the deflector blades 46. As a result, the vortex generated by the deflector element persists in the air issuing from the outlet. This air then mixes rapidly with ambient air reducing in velocity and reaching rapid temperature equilibrium.

Because of constraints imposed by the quality of sealing of the various floor components, the exhaust fan system is designed to produce a pressure drop below ambient in the underfloor space of no more than about 10 pascals. It is found, however, that even this low pressure differential is sufficient to draw a significant flow of ambient air in through opening 62 and along the conduit over temperature sensor 63. It is quite unexpected that this should be possible at such low pressures, particularly in such close proximity to an upwardly flowing vortex. The out of balance temperature signals that are provided by the described outlet are used to vary the volume of conditioned air supplied to the outlet. In a practical situation, perhaps only one of a number of ports supplied from the same variable air volume control would be provided with a temperature sensor, the remaining ports being then controlled effectively as slaves.

Because the circular grill 48 and the air deflecting element 42 are simply dropped into position in the ring part 10, they can very easily be removed to enable variation of the temperature set point through potentiometer 72.

The ability to achieve accurate temperature sensing within the floor mounted outlet according to this invention greatly simplifies the temperature control system. There is no longer any need for separate room thermostats wired individually to the control centre. It will be appreciated that the electrical connection of a temperature sensor in the described outlet to the variable air volume control is very simple, following as it does the line of the air ducting.

This invention has been described by way of example only and a variety of modifications are possible without departing from the scope of the invention. For example, it would be possible to employ different forms of vortex generator other than the described deflector. Vanes or baffles could be provided in either the ring part or the plenum part although it is preferred that the plenum part should define a stabilising chamber upstream of the vortex generator enabling an upward flow to be established at relatively low noise levels before the vortex generator is encountered. The manufacture of the deflector element from a single piece of sheet metal has the merit of simplicity but other methods of construction are possible; for example plastics moulding. The use of a deflector element which is separate from the grill is felt to be particularly advantageous. As will be evident, the grill must be capable of supporting floor loads and this imposes significant design constraints. The design of the separate air deflector can however be dedicated to the function of generating a vortex, enabling optimum aerodynamic performance to be achieved.

It will be apparent that in certain applications—for example where the outlets are to operate as slaves—it is not essential for a temperature sensor to be provided. The conduit can then, optionally, be omitted.

In certain particular situations where—for example—outlets are distributed around the perimeter of a high-ceiling room, it may be advantageous to omit the vortex generator. Since the described air deflector is simply dropped into position this can be achieved without structural modification. The described benefits of the temperature sensor will still be achieved.

It will be apparent to the skilled man that the body of the outlet can be produced in forms other than the described two-part form although this is felt to be particularly attractive enabling both assembly and mounting of the outlet to be achieved by the use of a single bolt. In applications where strict fire standards are set, the major components of the outlet, with the possible exception of the air deflector element which is enclosed, would be produced of metal. In other applications, materials such as plastics could be employed.

By the use of blanking rings engaged in one or more of the grill annular slots, an outlet designed for one particular flow rate can operate with substantially the same performance characteristic at reduced flow rates. This leads to considerable economies in manufacture.

We claim:

1. A floor-mounted outlet for an air conditioner or ventilator, comprising:

a circular grill adapted to be received in a circular floor opening and provided with a plurality of radially spaced mutually concentric ring elements;

means for feeding air to said grill from below; and a baffle disposed between said means and said ring elements for imparting a vortex movement to air rising through said grill about a substantially vertical axis perpendicular to said grill and surrounded by said elements, said baffle being provided with a central disc and a multiplicity of angularly equispaced radially extended blades twisted out of the plane of said disc and projecting therefrom, said elements being interconnected by radial ribs inclined to the vertical with substantially the same inclination as said blades are inclined with the vertical.

2. A floor-mounted outlet defined in claim 1 wherein said blades are formed unitarily with said disc.

3. A floor-mounted outlet defined in claim 1 wherein said means includes a plenum disposed below said grill and opening upwardly toward said grill, said plenum having a radial inlet connected with a source of air.

4. A floor-mounted outlet defined in claim 1 wherein said means includes a plenum disposed below said grill and opening upwardly toward said grill, said plenum having a radial inlet connected with a source of air.

5. A floor-mounted outlet defined in claim 4 wherein said plenum is formed by an upwardly open generally cup shaped member having a central pedestal disposed in line with said disc and therebelow and defining around said pedestal an annular space opening upwardly through spaces between said elements.

6. A floor-mounted outlet defined in claim 5 wherein said grill has a downwardly open recess receiving said pedestal and said recess and said pedestal are provided with juxtaposed walls extending perpendicular to said axis and parallel to said disc.

7. A floor-mounted outlet defined in claim 6 further comprising bolt means traversing said walls and securing said pedestal to said grill.

8. A floor-mounted outlet defined in claim 5 wherein said grill and said member are provided with annular flanges sandwiching the floor provided with said opening between them.

9. A floor-mounted outlet defined in claim 1 wherein said grill is formed with a passage communicating with a suction source and adapted to draw room air through said passage, said outlet further comprising a temperature sensor in said passage.

10. A floor-mounted outlet defined in claim 9 wherein said passage has a mouth receiving said room air and is formed with a constriction between said mouth and said sensor.

11. A floor-mounted outlet defined in claim 10 wherein said grill is formed with a cylindrical wall and said passage is formed in said cylindrical wall.

12. A floor-mounted outlet defined in claim 11 wherein said outlet is provided with a comparator receiving an input from said sensor and from a set point generator for producing a control signal.

13. A floor-mounted outlet defined in claim 7 wherein said grill is formed with a passage communicating with a suction source and adapted to draw room air through said passage, said outlet further comprising a temperature sensor in said passage.

14. A floor-mounted outlet defined in claim 13 wherein said passage has a mouth receiving said room air and is formed with a constriction between said mouth and said sensor.

15. A floor-mounted outlet defined in claim 14 wherein said grill is formed with a cylindrical wall and said passage is formed in said cylindrical wall.

16. A floor-mounted outlet defined in claim 15 wherein said outlet is provided with a comparator receiving an input from said sensor and from a set point generator for producing a control signal.

* * * * *